April 25, 1933. R. L. HERMAN 1,905,709
COLLAPSIBLE TAP
Filed May 31, 1930
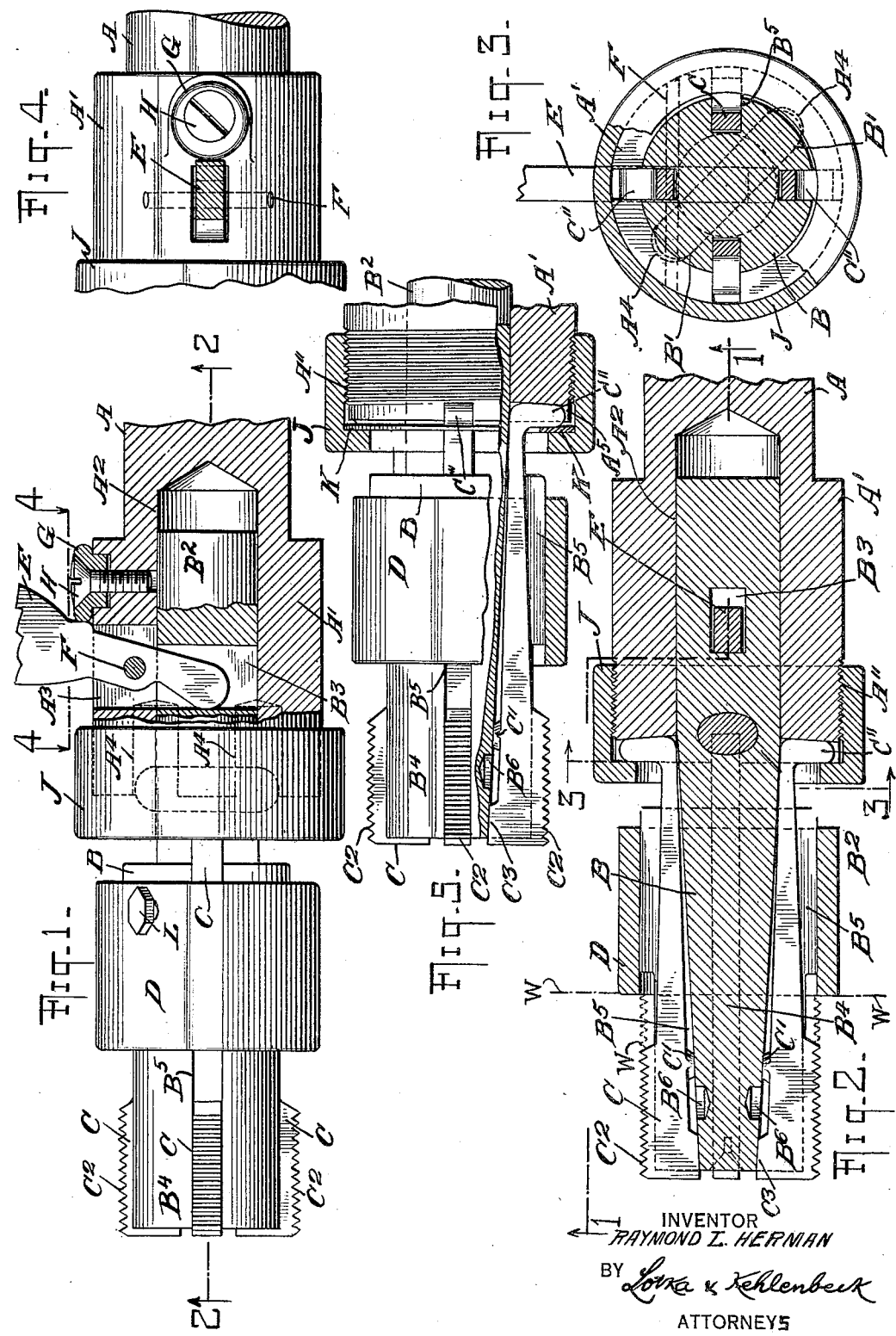
INVENTOR
RAYMOND L. HERMAN
BY Lotka & Kehlenbeck
ATTORNEYS Patented Apr. 25, 1933

1,905,709

UNITED STATES PATENT OFFICE

RAYMOND L. HERMAN, OF NEW YORK, N. Y., ASSIGNOR TO BENJAMIN MAY AND LOUIS SCHULMAN, OF BROOKLYN, NEW YORK, A PARTNERSHIP

COLLAPSIBLE TAP

Application filed May 31, 1930. Serial No. 457,817.

My present invention relates to that type of taps for cutting internal screw threads in which the tool consists of a plurality of jaws or chasers which are movable to expand the tool to the working position, or contract it to enable it to be inserted in the part to be threaded, or withdrawn therefrom readily. The novel features of my present invention relate particularly to an improved construction of the chasers and of the means for securing them in the body of the tap, as well as improvements in the operating handle and its stop.

Two satisfactory embodiments of my invention are shown in the accompanying drawing, in which Fig. 1 is a longitudinal section on line 1—1 of Fig. 2, the latter being a section on line 2—2 of Fig. 1; Fig. 3 a cross section on line 3—3 of Fig. 2; Fig. 4 is a detail section on line 4—4 of Fig. 1; and Fig. 5 is a partial section of a modification.

The collapsible tap shown in the accompanying drawing comprises, as its main parts, a body A, A', a sliding head B, a set of chasers C, a clamping collar or nut J for securing the chasers, an operating handle E, and a trip head D.

The end A of the tap body has a cylindrical outer surface and is adapted to be fitted into a suitable holder, say on a turret lathe, said holder preventing rotation of the body, but giving it the customary longitudinal feed movement toward the blank or work W during the threading operation, said work being rotated during such operation by any approved or well-known means, but having no other motion. Of course, any equivalent mechanism may be employed for producing the relative rotation and the relative longitudinal or feed movement. At the other cylindrical end, A', the tap body is of enlarged diameter and has an external screw thread A'', as well as a cylindrical axial chamber or bore $A^2$ which extends from end to end in said body portion A' and also into the body portion A.

The body portion A' has at one side a longitudinal slot $A^3$ communicating with the chamber $A^2$, and through this slot extends a handle E pivoted to said body portion at F. The swinging movement of the handle is limited in one direction by a stop G. In my present invention, this stop consists of a disk, preferably set within a recess in the outer surface of said body portion A', and normally held stationary by a screw H eccentric to said disk. By loosening this screw, the stop G is released and can be turned around the screw as a pivot, so that, owing to the eccentric location of such screw or pivot, the position of the disk's periphery relatively to the handle E will be altered, and the handle E will be allowed more or less movement toward said screw. By properly selecting the eccentricity of the screw H and the shape of the stop, a very minute adjustment of the stop action can be obtained.

According to Figs. 1 and 3, two longitudinal grooves $A^4$ are provided at diametrically opposite points of the chamber $A^2$, at the free end of the enlarged body portion A'. Into these grooves are fitted slidably, diametrically opposite projections B' on the end or shank $B^2$ of the sliding head B. These projections may be formed by the ends of a pin driven through said shank. The latter has a transverse opening $B^3$, in registry with the slot $A^3$, into which extends the (preferably rounded) inner end of the handle E. By swinging the outer portion of this handle toward the stop G, the inner end of the handle will be caused to impart a longitudinal movement to the head B and the parts carried thereby, in a direction away from the body portion A. The central portion of the head B is of greater diameter than the shank $B^2$, and the other end portion $B^4$ is again of smaller diameter. Both the central portion and the end portion $B^4$ are solid and mainly cylindrical, and provided in their outer surface with longitudinal grooves $B^5$ (four, as shown) arranged at equal distances from each other. The side walls of the same groove are parallel to each other, while the inner or bottom walls of these grooves are oblique with reference to the axis of the head B, and converge toward the free or working end of said head. Adjacent to the free end of the portion $B^4$, small depressions or sockets $B^6$ are provided in the inner or bottom walls of the grooves $B^5$.

Into these sockets are adapted to project, in the collapsed condition of the tap, projections or lugs $C'$ on the inner edges of the chasers C, which are fitted into said grooves. The attached or stationary ends of said chasers are firmly secured to the body portion $A'$ by means of a clamping nut J screwing on the thread $A''$ and adapted to press outwardly-extending lugs $C''$ of said chasers, against the corresponding surface of said body portion. In Fig. 2, the chaser lugs $C''$ engage a concave (conical) end surface on the body portion $A'$. In Fig. 5, each chaser lug $C''$ is fitted into a separate recess $A^5$ of the body portion $A'$, so as to prevent any tendency to circumferential shifting of the chasers on said body portion, and the lugs $C''$ project slightly from said recesses, so as to be pressed against the bottoms of the recesses by the inwardly-extending flange of the collar or nut J, preferably with the interposition of a washer K made of leather or other suitable material.

The working ends of the chasers are provided at their outer edges with the customary threaded portions $C^2$ to cut internal screw threads as the tap is operating. These threads may be either straight threads or taper threads, and the threaded portions will be formed accordingly. The chasers are made of elastic material, so that while their attached ends remain stationary relatively to each other, their working ends may move toward or from each other. The spring action of these chasers tends to throw them inwardly, that is to say, toward each other; but when the head B is moved lengthwise toward the blank or work W, the converging inner surfaces of the grooves $B^5$ will force or wedge the chasers apart, into their outer or working position. When the head is moved in the other direction, the chasers C will spring toward each other, to the collapsed position of the tap, and the lugs $C'$ will enter the sockets $B^6$, the enlarged or thickened portions $C^3$ of the chasers overlapping the end face of the head portion $B^4$, whereas in the active or expanded position of the tap, these end portions $C^3$ will engage the outer surface of said head portion $B^4$.

A trip head D has been mounted on the head B to provide means for stopping the thread-cutting action automatically when the chasers C have progressed to a certain depth. Preferably, this head D is adjustable lengthwise; for instance, it may be fastened to the head B by a set screw L, upon the loosening of which the head D may be shifted lengthwise of the head B. Before and during the thread cutting operation, the heads B, D will be connected rigidly, the free or active end of the trip head D having been set at the desired distance from the working ends of the chasers C, with respect to the expanded or working position of these chasers.

The side walls of the grooves $B^5$ are in contact with the shanks C at all times, whether the tap is expanded or collapsed. The inclined, converging inner or bottom walls of the grooves $B^5$ are straight longitudinally.

In order to expand the tap to the working position, the operator swings the handle E to the position shown in Fig. 1, thereby causing the head B to be moved lengthwise relatively to the stationary body A, $A'$. The end portion $B^4$ of the head B is thus brought between the thickened end portions $C^3$ of the chaser, and the threaded portions $C^2$ of the chasers are thereby moved into the expanded or working position of the tap. During this outward or expanding movement of the chasers, the lugs $C'$ are first lifted out of the sockets $B^6$, and then ride on the inner or bottom walls of the longitudinal grooves $B^5$, the inner surfaces of said lugs being in line with the inner surfaces of the end portions $C^3$.

During the cutting of the threads, the chasers remain stationary in their expanded position (except for the longitudinal feed movement), while the work W is rotated about the longitudinal axis of the tap. Finally, at the desired point, according to the setting of the trip head D relatively to the head B, the end face of the work W comes in contact with the end face of the trip head D and moves the latter, together with the head B, toward the body A, $A'$. This causes the chasers C to move toward each other by their own elasticity, owing to he convergence of the grooves $B^5$, until the thickened portions $C^3$ jump over the end face of the head portion $B^4$, and the lugs $C'$ into the sockets $B^6$, thereby bringing the tap to the collapsed position, and releasing the work from the chasers. The inner longitudinal edges of the chaser shanks C are then in contact with the inner or bottom walls of the grooves $B^5$. This longitudinal movement of the head B will also swing the handle E on its pivot F, in a direction to move such handle out of contact with the stop G. The tap may then be withdrawn from the work lengthwise.

The employment of a solid head portion $B^4$ instead of the hollow head employed in previous constructions, enables me to use my invention for taps of much smaller size than previous collapsible taps. The improved construction is very strong and durable. The projections $B'$ transfer any torsional strain coming on the head $B^4$, B, $B^2$, directly to the body $A'$, A, and thus relieve the chasers C of any torsional or twisting strains. Any other suitable means may be employed for connecting the head B with the body A, $A'$ in such a manner as to prevent relative rotation and to transfer any twisting strains from the head B to the body A without allowing such strains to come upon the chasers C. The fact that the chasers C engage the side walls of the grooves B⁵ at all times, affords a further safeguard against twisting strains on the chasers.

In either of the constructions illustrated, the clamping collar or nut J provides an effective means for securely attaching the chasers to the body, while permitting the parts to be readily dismembered, as when it is desired to remove the chasers for any purpose, for instance the substitution of straight thread chasers for taper thread chasers or vice versa.

The stop G enables me to adjust in a very accurate manner, the position at which the handle E will be brought against said stop; in other words, a micrometer adjustment of the stop is provided. Such small adjustment is particularly desirable after the slight reduction in diameter which takes place when the chasers are reground.

Various modifications may be made without departing from the nature of my invention as set forth in the appended claims.

I claim:

1. A collapsible tap comprising a body, a head slidable lengthwise relatively to said body, inwardly-springing chasers engaging said head, the latter being formed to expand the tap by moving the working portions of the chasers outwardly when the head slides in one direction relatively to the body, said chasers having attaching portions adjacent to the body, and a clamping collar mounted on the body movably and arranged to press said attaching portions firmly against the body to hold them stationary relatively thereto.

2. A tap according to claim 1, in which the clamping collar screws on the body.

3. A tap according to claim 1, in which the attaching portions of the chasers are pressed by the clamping collar against the end surface of the body.

4. A tap according to claim 1, in which the end surface of the body has individual recesses to receive the attaching portions of the several chasers.

5. A collapsible tap comprising a body, a head slidable lengthwise of said body, chasers engaging said head, the latter being formed to cause the chasers to move toward or from each other according as the head slides in one direction or the other, a handle movably mounted on said body and engaging the said head, and a stop mounted to turn on said body about an axis which is eccentric of the periphery of said stop and transverse to the direction in which the head slides, said periphery of the stop being adapted for engagement by said handle.

6. A tap according to claim 5, in which the stop is mounted to turn on a screw which serves to lock the stop after adjustment.

7. A collapsible tap comprising a body, a head slidable lengthwise relatively to said body, chasers engaging said head, each of said chasers having an elastic longitudinal shank springing inwardly toward said head, a threaded cutting portion at one end of said shank, and a transversely extending attaching portion at the other end of the shank, the said head being formed to expand the tap by moving the working portions of the chasers outwardly when the head slides in one direction relatively to the body and a clamping collar mounted on the body movably and arranged to press said transverse attaching portions firmly against said body to hold them stationary relatively thereto.

In testimony whereof I have hereunto set my hand.

RAYMOND L. HERMAN.